Jan. 25, 1949.　　　　P. C. MICHEL　　　　2,460,142
ELECTRONIC CALIBRATING MEANS FOR INDICATING
INSTRUMENTS IN PULSE ECHO SYSTEMS
Filed Jan. 30, 1945
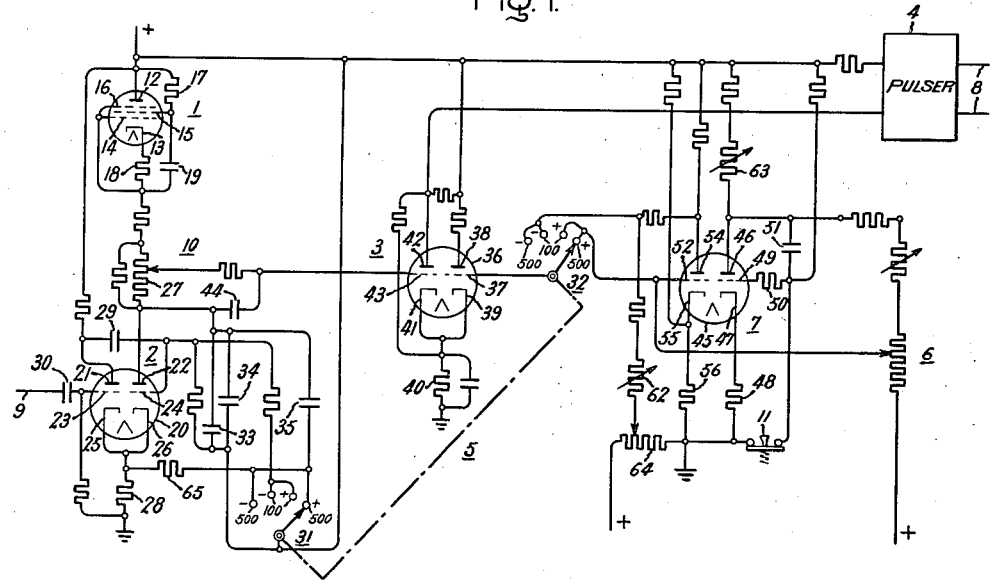
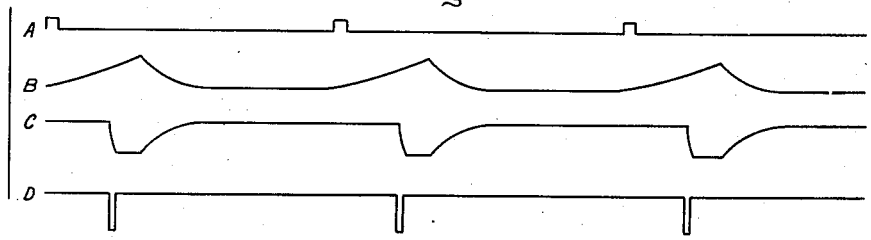
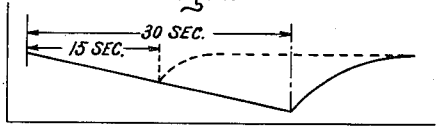
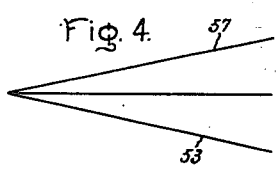
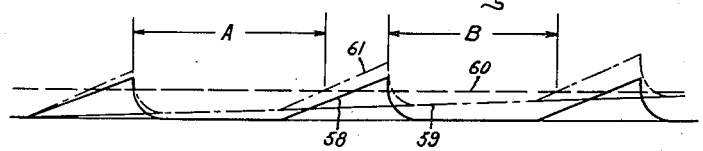
Inventor:
Philip C. Michel,
by Harry E. Dunham
His Attorney.

Patented Jan. 25, 1949

2,460,142

UNITED STATES PATENT OFFICE 2,460,142

ELECTRONIC CALIBRATING MEANS FOR INDICATING INSTRUMENTS IN PULSE ECHO SYSTEMS

Philip C. Michel, Schenectady, N. Y., assignor to General Electric Company, a corporation of New York Application January 30, 1945, Serial No. 576,567

7 Claims. (Cl. 250—27)

This invention relates to pulse echo systems and more particularly to means for calibrating certain of the indicating devices in such systems.

Pulse echo systems have been proposed for the determination of the range and relative velocity of a desired object. Such systems are useful on moving objects, such as aircraft and ships, for studying the relative motion of other moving objects, or for indicating the approach of a moving object to a fixed object. Thus, it may be desired to determine the relative speed between relatively nearby aircraft and also to determine whether the distance between them is becoming less or greater. For the satisfactory operation of such systems, it is necessary to have available testing equipment for calibrating accurately the indicating instruments associated with the pulse echo system.

It is an object of my invention to provide calibrating or testing equipment capable of checking either the range or relative velocity indicators, or both, in pulse echo systems.

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Fig. 1 is a schematic diagram of the circuits constituting one embodiment of my invention, and Figs. 2 to 5 inclusive are diagrams illustrating operating characteristics of the circuit illustrated in Fig. 1.

In accordance with my invention, there is provided calibrating apparatus which provides an artificial target pulse which can be made to move over a wide range of relative distances at a wide range of relative velocities with respect to an external input synchronizing pulse derived from the pulse echo system being calibrated.

Referring to Fig. 1 of the drawing, there is provided a fast sweep generator 1 arranged to generate a timing wave at a recurrence rate of the order of microseconds. There is also provided gating means 2 for initiating operation of the fast sweep generator in response to suitable synchronizing pulses received from the pulse echo system. The voltage obtained from the fast sweep generator is impressed upon a trigger device 3 which in turn triggers a suitable pulsing device 4. The artificial target pulses emitted from the pulser are impressed on the pulse echo system to be calibrated.

The circuit shown in Fig. 1 is designed to calibrate velocities at two levels. The absolute values of the velocities will depend upon the values of the various components of the circuit. In the particular example illustrated herein, the velocities are of the order of 100 and 500 miles per hour away from or toward the reference point which in practical operation is the side of the pulse echo equipment. In order to choose the approximate rate and direction of travel there is provided a two arm switch 5 having plus and minus 100 miles per hour positions and plus and minus 500 miles per hour positions, the terms plus and minus referring to the relative approach and recession, respectively, of the objects involved. The position of switch 5 determines the maximum velocity to be calibrated. In order to select a lower velocity than the maximum, there is provided a fractional velocity multiplier or control 6 shown in the form of a potentiometer. When the arm of the potentiometer engages one end of the resistance the velocity is minimum and when the arm is at the other end of the resistance the velocity is the maximum for the setting of switch 5. In operation, assuming power is suitably connected to the circuit, and output leads 8 and input lead 9 are suitably connected to the equipment to be tested, the relative velocity control 5 is turned to the desired position. For purposes of description, let it be assumed that the switch 5 is turned to the plus 500 miles per hour position as indicated in Fig. 1. The velocity multiplier potentiometer 6 is set to a position corresponding to the absolute velocity to be calibrated as, for example, 350 miles per hour. There is provided an initial range control 10 which is operated until the pulse echo equipment being calibrated locks on the artificial target pulse from the pulsing device 4. Under these conditions the range indicator of the pulse echo equipment now varies as the range of the artificial target changes.

Hold down switch 11 is then pressed, making operative the slow sweep generator to modify the bias or threshhold of the trigger device 3. By reason of changing bias during the operative period of the second sweep generator 7, as hereinafter explained, the target indication will move in the selected direction (toward the operator for conditions as illustrated in Fig. 1) at a selected rate (determined by the relative velocity switch 5 and velocity multiplier potentiometer 6).

Describing my invention in greater detail, the fast sweep generator 1 includes an electron discharge device illustrated as being of the pentode type having an anode 12, a cathode 13, control electrode 14, screen grid electrode 15 and suppressor grid 16. The anode 12 is connected to a suitable source of positive potential, the negative terminal of said source being grounded. The screen electrode 15 is connected to a suitable source of potential through a suitable voltage limiting resistor 17. The cathode 13 is connected to the upper end of a cathode bias resistor 18. The suppressor grid 16 and control electrode 14 are connected together and to the lower end of resistor 18. In order to maintain relatively constant the potential on screen electrode 15 with respect to the cathode, there is provided a capacitor 19 connected between the screen electrode 15 and the lower end of resistor 18. In series with the above-described electron discharge device, there is a second electron discharge device 20 which may be a suitable double-triode type having anodes 21 and 22, control electrodes 23 and 24 and cathodes 25 and 26 respectively. The cathode 13 is connected to the anode 22 through the bias resistor 18 and the initial range control 10 including potentiometer 27. The cathodes 25 and 26 are connected together and to ground through a bias resistor 28. The control electrode 24 is connected to the anode 21 through a suitable capacitor 29. The two sides of the electron discharge device 20 are connected together for multivibrator operation with the right hand side normally conducting and the left hand side normally cut off. When a sufficiently positive synchronizing pulse from the pulse echo system is impressed upon the control electrode 23, as by means of a suitable coupling capacitor 30, multivibrator action quickly renders the left side conductive and the right side of electron discharge device 20 non-conductive, the control electrode 24 having been driven sufficiently negative to cut off the discharge current.

The relative velocity switch 5 comprises a pair of switch elements 31 and 32 having switch arms arranged to engage a plurality of contacts as indicated in the drawing. As briefly explained heretofore there are four switch positions. The first position represents a negative velocity of 500 miles per hour, the second position represents a negative rate of 100 miles per hour, the third position represents a positive rate of 100 miles per hour and the fourth position (indicated in the drawing) represents a positive rate of 500 miles per hour. The switch arm of switch element 31 is connected to a suitable source of positive potential and also to one side of capacitors 33 and 34. The negative and positive 500 miles per hour contacts of switch element 31 are connected together and to one side of capacitor 35. The other sides of capacitors 33, 34 and 35 are connected together and to anode 22 and the lower terminal of potentiometer 27. Thus, when the relative velocity switch 5 is in one of the 500 miles per hour positions all three capacitors are connected in parallel to the source of positive potential whereas in the 100 miles per hour position of the switch only capacitors 33 and 34 are connected to the source of potential.

When the right hand side of discharge device 20 is conducting, the capacitors connected in the circuit become charged. At the instant that discharge device 20 is cut off, the lower sides of capacitors 33 and 34 (and capacitor 35 in either of the 500 miles per hour positions) are at the potential of the positive source and the upper sides of the capacitors are at the potential of anode 22. While the right hand side of discharge device 20 is cut off, the potential of the upper sides of the capacitors rises substantially linearly toward that of the lower side. That is the condenser 33 and 34 discharge.

The action thus far described is indicated graphically in Fig. 2. At line A there are illustrated representative positive synchronizing pulses from conductor 6. Line B represents the potential at the upper sides of the capacitors 33 and 34 and hence, at the anode 22 of discharge device 20. When the right side of discharge device 20 again becomes conductive, the potential at the upper sides of the capacitors falls to its normal value and the sweep generator and gating means are conditioned for the next synchronizing pulse.

The trigger device 3 comprises an electron discharge device 36 of a suitable double triode type although two separate suitable electron discharge devices may be used. The right hand side acts as a cathode follower and normally conducts current of magnitude depending upon the potential appearing at the control electrode 37. This potential is determined by the setting of the relative velocity switch 5. The anode 38 is connected to a suitable source of positive potential. The cathode 39 is connected to ground through a suitable bias resistor 40. The cathode 41 of the left hand or trigger side of the discharge device 36 is connected to cathode 39 and the upper end of resistor 40. The anode 42 is connected to the pulsing device 4. The control electrode 43 is connected to the arm of the potentiometer 27 through a suitable potential limiting resistor. In order to minimize the effect of the grid-cathode capacity in the left hand side of discharge device 36, a suitable capacitor 44 is connected between anode 22 and control electrode 43.

As the potential at the lower end of potentiometer 27 increases, the potential at the control electrode 43 increases proportionately. Eventually, depending upon the bias established for the trigger device, the left hand side of device 36 conducts current. Thus, at a certain delay time after the synchronizing pulse is applied to control electrode 23 of discharge device 20, a time interval depending upon the setting of the potentiometer 27 and the bias of the left side of discharge device 36, a trigger pulse appears on anode 42 as indicated at line C in Fig. 2 which results in the emission of an artificial target pulse from the pulser 4 as indicated at line D in Fig. 2.

The apparatus thus far described is sufficient to calibrate the range indicator of a pulse echo system. For example, a range within the limits of the pulse echo system and the calibrating device is selected by properly adjusting potentiometer 27. Assuming connection of the calibration device to the pulse echo system, the artificial target pulse should appear at the chosen range mark on the pulse echo equipment. In order to check different ranges, it is simply necessary to change the setting of potentiometer 27. In a typical embodiment of this circuit, capacitors 33, 34 and 35 are so chosen that the range coverage with switch 5 in the 100 miles per hour setting is approximately 400 to 4000 yards and in the other setting approximately 1000 to 18,000 yards. In some cases, the entire desired range may be covered with only one value of capacity but where an extended range coverage is required, more satisfactory results are obtained if several condensers are used because of improved accuracy obtained, and minimum voltage source requirements.

In order to calibrate that portion of the pulse echo system used for checking the relative velocities of moving objects, there is provided means for continuously, and preferably linearly, varying the threshold on the trigger side of discharge device 36 in either the positive or negative direction. For this purpose, there is provided the slow sweep generator 7 having a period of recurrence of the order of seconds (it will be recalled that the period of recurrence of the fast sweep generator is of the order of microseconds). The voltage derived from the slow sweep generator is applied to the control electrode 37 of electron discharge device 36. Any change in the bias of control electrode 37 varies the current through the resistor 40 and hence the threshold of the left hand side of electron discharge device 36. Accordingly, it will take a shorter or longer time for the linearly increasing voltage applied to control electrode 43 to overcome the threshold depending upon the direction in which the potential of control electrode 37 is changing.

The illustrated slow sweep generator 7 includes an electron discharge device 45 which may be of a suitable double triode type. The anode 46 of the right hand side is connected to a suitable source of positive potential through the positive range set control 63 illustrated in the form of a variable resistor. The cathode 47 is connected to ground through a suitable bias resistor 48. The control electrode 49 is connected to ground through a resistor 50 and normally closed hold down switch 11. A suitable capacitor 51 is connected between anode 46 and the junction between resistor 50 and hold down switch 11. The junction between hold down switch 11 and capacitor 51 is connected to a suitable source of positive potential. With this arrangement, the control electrode 49 is normally grounded through the switch 11. When it is desired to initiate operation of the slow sweep generator, hold down switch 11 is pressed thereby opening the circuit from grid to ground. As soon as the switch 11 is opened the lower side of capacitor 51 is released from ground and the capacitor 51 begins to discharge substantially linearly until the switch is released, thereby again grounding the capacitor, or until grid current flows in the right hand side of discharge device 45. The potential on control electrode 49 follows the voltage on the lower side of capacitor 51 so that as this voltage increases linearly, the current flow through the right hand side of discharge device 45 increases proportionately. As a result, the potential of anode 46 decreases linearly and therefore a linearly decreasing voltage appears on the arm of velocity multiplier 6. The arm of the velocity multiplier potentiometer is connected to control electrode 52 of the left hand or phase inverter side of discharge device 45 and to the plus 100 miles per hour and plus 500 miles per hour contacts on switch element 32. Therefore, the decreasing voltage causes the potential on control electrode 37 of discharge device 36 to decrease whenever the switch 32 is engaging the positive rate contacts. As a result, with switch 5 in the position shown, the current through the cathode follower side of discharge device 36 decreases, the current through resistor 40 decreases and the threshold on the left hand or trigger side of discharge device 36 also decreases continuously and substantially linearly. Therefore, the trigger side triggers continuously faster, that is, after shorter and shorter intervals, as long as the hold down switch 11 is held open or until grid current flows in the right hand side of discharge device 45.

Fig. 3 represents the effect of holding open the switch 11 for different lengths of time. In a typical embodiment of my invention approximately 40 seconds is required to cause grid current to flow in the right hand side of discharge device 45. The full line in Fig. 3 is representative of the condition where the switch 11 is held open for 30 seconds. If the switch is held open only 15 seconds, the charging voltage follows the same line but halts sooner and at a lower maximum amplitude as indicated by the dashed line. In Fig. 4 the line 53 represents the continuously and linearly decreasing voltage appearing at control electrode 37.

The anode 54 of the left hand or phase inverter side of discharge device 45 is connected to a suitable source of positive potential and to the negative switch contacts of switch element 32 through a suitable voltage limiting resistor. The cathode 55 is connected to ground through a suitable bias resistor 56. As the voltage on control electrode 52 decreases, as explained above, the current through the left hand side of discharge device 45 decreases whereby the potential of anode 54 increases continuously and substantially linearly as indicated by the line 57 in Fig. 4. Whenever the switch arm of switch element 32 is turned to a position in which the switch arm engages either of the negative rate contacts, the potential on control electrode 37 will continuously and linearly increase in the positive direction, when switch 11 is opened, causing a continuous increase in current through the right hand side of discharge device 36, a continuous increase in current through resistor 40 and therefore a continuous substantially linear increase in the threshold of the left hand side of the discharge device 36 and so, as time goes on, an increasingly higher voltage is required from the initial range control potentiometer 27 to cause triggering of the pulser. The result is that the device 36 triggers after longer and longer intervals.

Hence the time intervals after reception of pulses on condenser 9 when device 36 triggers device 4 increase or decrease at a uniform rate in accordance with the direction of change or relative potential of the potential impressed on the control electrode 37 of the right hand side of discharge device 36 and therefore in accordance with the direction and extent to which the threshold is modified when the slow sweep generator is operative. Fig. 5 depicts graphically the variation in trigger time of the discharge device 36. Time relationships have been distorted to illustrate clearly operating characteristics. The line 58 represents the sweep voltage applied to control electrode 43 as a result of the operation of the fast sweep generator and gating means. The line 59 represents a gradually increasing threshold at the left hand side of discharge device 36. Line 60 represents the normal threshold or cut-off bias on the left hand side of discharge device 36. Line 61 represents the resulting variation of potential on control electrode 43 of discharge device 36. Whenever the resultant effective control electrode potential crosses the cut-off line, represented by the numeral 60, the trigger device is rendered operative. It will be noted that as time passes, the interval between successive periods of energization of the left hand side of device 36, as indicated by A and B in Fig. 5, becomes less and less. If the switch 5 is in one of the negative rate positions, a similar analysis would show triggering at greater and greater intervals as the hold down switch is operated.

Means is provided to make the initial range of the artificial target pulses independent of the setting of velocity multiplier 6. That is, with switch 11 closed variation of the position of the movable contact on potentiometer 6 should not affect the potential on grid 37 of device 36 or the bias voltage on resistance 40 irrespective of the position of switch 5. This is accomplished by adjusting the voltage on the anode 46 to the same amplitude as that on the lower end of the velocity multiplier 6. With such an arrangement, variation of the arm of potentiometer 6 will not upset the voltage relationships on the left hand side of discharge device 45 and the starting potential, i. e. the potential when switch 11 is first opened, on the movable arm of velocity multiplier 6 will always be equal to the potential on anode 46, assuming proper adjustment of resistor 63.

In order to provide, at any given range, the same rate of change of relative velocities for approach and recession tests, there is provided an adjustable resistance 62 connected between the negative contacts of the switch element 32 and the arm of the potentiometer comprising the negative rate range set control 64. The same starting voltage at switch 5 may be obtained for the positive and negative directions of relative velocity by changing the negative rate range set control 64. In other words, the starting voltage on the negative rate contacts of switch element 32 is determined by the setting of potentiometer 64 and negative rate calibration resistance 62. The starting voltage on the positive contacts of the switch element 32 depends upon the setting of the resistor 63 and the velocity multiplier 6, assuming that the voltage across control 6 has been properly adjusted to zero.

In order to compensate for the different cathode currents obtained in resistor 28 of gating means 2 in the 100 and 500 miles per hour positions of switch 5 and provide equal bias for the left hand side of device 20 in all positions of switch 5, there is connected between cathode 26 and the lower end of capacitor 35 a suitable resistor 65. This resistance 65 passes current from the positive terminal of the source of operating potential to ground through resistance 28 to produce increased bias thereon when switch 5 is in those of its positions where the bias on this resistance produced by current flowing through tube 20 is smaller. The bias on resistance 28 is produced in part at least by current flowing in grid 24 and through the different grid resistors to the positive terminal of the source of operating potential. These resistors have values chosen in accord with the desired rates of variation of the rise in voltage represented by curve B. Since they are unequal, unequal currents flow in the grid when switch 5 is in different positions. Resistance 65 is chosen to make the bias on resistance 28 equal in all positions of the switch notwithstanding the unequality of the current flowing in tube 20 for different positions of the switch.

The complete calibrating system, the fast sweep generator and certain aspects of the slow sweep generator are shown, described and claimed in the copending application of Don M. Jacob, Serial No. 575,309, filed of even date, and assigned to the same assignee as the present invention.

While I have shown and described a particular embodiment of my invention, it will be obvious to those skilled in the art that changes and modifications may be made without departing from my invention in its broadest aspects, and I therefore aim in the appended claims to cover all such changes and modifications as fall within the true spirit and scope of my invention.

What I claim as new and desire to secure by Letters Patent of the United States, is:

1. The combination, in a system for producing pulses simulating echoes from a remote moving object of recurrent pulses transmitted to said moving object, of means to produce pulses simulating echoes, each echo simulating pulse being produced after a predetermined interval following a corresponding one of said recurrent pulses, means to increase or decrease said intervals following successive ones of said recurrent pulses thereby to cause said successive echo simulating pulses to occur at times after the corresponding recurrent pulses corresponding to a movement of said object in directions of increased or decreased range respectively and common adjustment means for adjusting the rate of said increase and decrease of said intervals.

2. The combination, in a system for producing pulses simulating echoes from a remote moving object of recurrent pulses transmitted to said moving object, of means to produce pulses simulating echoes, each echo simulating pulse being produced after a predetermined interval following a corresponding one of said recurrent pulses, means to increase or decrease said intervals following successive ones of said recurrent pulses thereby to cause said successive echo simulating pulses to occur at times after the corresponding recurrent pulses corresponding to a movement of said object in directions of increased or decreased range respectively, and means to equalize said rates of decrease and increase produced by any adjustment of said common adjustment means.

3. The combination, in a system for producing pulses simulating echoes from a remote moving object of recurrent pulses transmitted to said moving object, of means to produce pulses simulating echoes, each echo simulating pulse being produced after a predetermined interval following a corresponding one of said recurrent pulses, and means to increase or decrease said intervals following successive ones of said recurrent pulses thereby to cause said successive echo simulating pulses to occur at times after the corresponding recurrent pulses corresponding to a movement of said object in directions of increased or decreased range respectively, common adjustment means for adjusting the rate of said increase and decrease of said intervals, means to initiate action of said interval increase and decrease means, and means to prevent adjustment of said common adjustment means from affecting the interval between said recurrent pulses and the corresponding echo simulating pulses occurring at the instant of initiation of action of said echo increase and decrease means by said action initiating means.

4. The combination, in a system for producing pulses simulating echoes from a remote moving object of recurrent pulses transmitted thereto, means to produce a unidirectional voltage varying with time, means to control the intervals between the different recurrent pulses and the next echo simulating pulse in accord with said voltage, said last means comprising an electron discharge device having an anode, a cathode and a control electrode, a source of operating potential, said cathode being connected to the negative terminal of said source, a resistance connected between said anode and the positive terminal of said source, a condenser between said anode and control electrode, a switch between said control electrode and cathode, said control electrode being connected to the positive terminal of said source, a potentiometer connected between said anode and a point of fixed potential equal to the potential of said anode when said switch is closed whereby when said switch is opened the charge in said condenser varies thereby varying the potential on said control electrode, and means to vary said unidirectional voltage in accord with the potential on said potentiometer.

5. The combination, in a system for producing pulses simulating echoes from a remote moving object of recurrent pulses transmitted thereto, means to produce a unidirectional voltage, means to control the duration of the interval between each recurrent pulse and the next echo simulating pulse in accord with said voltage, said last means comprising a pair of electron discharge devices and a source of operating potential, each discharge device having an anode, a control electrode, and a cathode, said cathode being connected to the negative terminal of said source and said anodes being connected through respective resistors to the positive terminal of said source, a condenser connected between the control electrode and anode of one of said devices, a switch connected between said last control electrode and a point of fixed potential, and a potentiometer connected between the anode of said one device and a point of fixed potental equal to the potential of said last anode when said switch is closed whereby when said switch is opened the potential across said potentiometer increases at at rate corresponding to the rate of change in charge in said condenser, means to supply potential from said potentiometer to said control electrode of said other device, and means to derive said voltage either from said potentiometer or from the anode of said other device, whereby the time intervals between said recurrent pulses and said echo simulating pulses increase or decrease when said switch is open from a duration independent of the adjustment of said potentiometer and at a rate determined by said condenser and the adjustment of said potentiometer.

6. The combination, in a system for producing pulses simulating echoes from a remote moving object of recurrent pulses transmitted thereto, means to produce a unidirectional voltage, means to control the duration of the interval between each recurrent pulse and the next echo simulating pulse in accord with said voltage, said last means comprising a pair of electron discharge devices and a source of operating potential, each discharge device having an anode, a control electrode, and a cathode, said cathodes being connected to the negative terminal of said source and said anodes being connected through respective resistors to the positive terminal of said source, a condenser connected between the control electrode and anode of one of said devices, a switch connected between said last control electrode and a point of fixed potential, and a potentiometer connected between the anode of said one device and a point of fixed potential equal to the potential of said last anode when said switch is closed whereby when said switch is opened the potential across said potentiometer increases at a rate corresponding to the rate of change in charge in said condenser, means to supply potential from said potentiometer to said control electrode of said other devices, and means to derive said voltage either from said potentiometer or from the anode of said other device, whereby the time intervals between said recurrent pulses and said echo simulating pulses increase or decrease when said switch is open from a duration independent of the adjustment of said potentiometer and at a rate determined by said condenser and the adjustment of said potentiometer and means to equalize the rates of change in potentials derived by said last means.

7. The combination, in a system for producing pulses simulating echoes from a remote moving object of recurrent pulses transmitted thereto, means to produce a unidirectional voltage, means to control the duration of the interval between each recurrent pulse and the next echo simulating pulse in accord with said voltage, said last means comprising a pair of electron discharge devices and a source of operating potential, each discharge device having an anode, a control electrode, and a cathode, said cathodes being connected to the negative terminal of said source and said anodes being connected through respective resistors to the positive terminal of said source, a condenser connected between the control electrode and anode of one of said devices, a switch connected between said last control electrode and a point of fixed potential, and a potentiometer connected between the anode of said one device and a point of fixed potential equal to the potential of said last anode when said switch is closed whereby when said switch is opened the potential across said potentiometer increases at a rate corresponding to the rate of change in charge in said condenser, means to supply potential from said potentiometer to said control electrode of said other devices, and means to derive said voltage either from said potentiometer or from the anode of said other device, whereby the time intervals between said recurrent pulses and said echo simulating pulses increase or decrease when said switch is open from a duration independent of the adjustment of said potentiometer and at a rate determined by said condenser and the adjustment of said potentiometer, and means to adjust the potentials derived by said last means when said switch is initially opened to equal values and to equalize the rates of change of said derived potentials.

PHILIP C. MICHEL.

REFERENCES CITED

The following references are of record in the file of this patent:

UNITED STATES PATENTS

| Number | Name | Date |
| --- | --- | --- |
| 2,188,530 | Schlesinger | Jan. 30, 1940 |
| 2,208,254 | Geohegan | July 16, 1940 |
| 2,264,197 | Hadfield | Nov. 25, 1941 |